(12) United States Patent
Panther

(10) Patent No.: US 10,185,308 B2
(45) Date of Patent: Jan. 22, 2019

(54) METHODS AND SYSTEMS TO PROVIDE UPDATE INFORMATION OF A DEVICE DESCRIPTION OF A FIELD INSTRUMENT

(75) Inventor: Mitchell Stephen Panther, Marshalltown, IA (US)

(73) Assignee: FISHER CONTROLS INTERNATIONAL LLC, Marshalltown, IA (US)

(*) Notice: Subject to any disclaimer, the term of this patent is extended or adjusted under 35 U.S.C. 154(b) by 1459 days.

(21) Appl. No.: 13/460,237

(22) Filed: Apr. 30, 2012

(65) Prior Publication Data
US 2013/0289747 A1 Oct. 31, 2013

(51) Int. Cl.
*G05B 13/02* (2006.01)
*G05B 19/418* (2006.01)
*G05B 19/042* (2006.01)

(52) U.S. Cl.
CPC ..... *G05B 19/4185* (2013.01); *G05B 19/0423* (2013.01); *G05B 19/41845* (2013.01);
(Continued)

(58) Field of Classification Search
CPC ........... G05B 2219/13127; G05B 2219/15068;
G05B 2219/23255; G05B 2219/23256;
G05B 2219/23258; G05B 2219/23261;
G05B 2219/25085; G05B 2219/25428;
G05B 2219/31098; G05B 2219/31103;
G05B 2219/31118; G05B 2219/31132;
G05B 2219/31134; G05B 2219/31326;
G05B 2219/32144; G05B 2219/33331;
G05B 13/02; G05B 15/02; G05B 19/02;
G05B 19/042; G05B 19/409;
(Continued)

(56) References Cited

U.S. PATENT DOCUMENTS

| 7,698,242 | B2* | 4/2010 | Van Camp | G05B 15/02 700/108 |
| 8,234,357 | B2 | 7/2012 | De Groot | |

(Continued)

FOREIGN PATENT DOCUMENTS

| DE | 102007047061 A1 | 4/2009 |
| GB | 2403043 A | 12/2004 |
| WO | 2007121141 A2 | 10/2007 |

OTHER PUBLICATIONS

International Searching Authority, "International Search Report", issued in connection with PCT patent application No. PCT/US2013/037683, dated Mar. 13, 2014, 3 pages.

(Continued)

*Primary Examiner* — Michael D Masinick
*Assistant Examiner* — Md N Mia
(74) *Attorney, Agent, or Firm* — Hanley, Flight & Zimmerman, LLC

(57) ABSTRACT

Methods and systems to update information of a device description of a field instrument are described. In one example, a method involves comparing a host revision of the device description executed via a host application to an instrument revision of the device description of the field instrument, generating a character string of update information based on the comparison, the character string containing the update information, and displaying the character string via the host application.

20 Claims, 5 Drawing Sheets

(52) U.S. Cl.
CPC ............... *G05B 2219/31134* (2013.01); *G05B 2219/32144* (2013.01); *G05B 2219/33331* (2013.01); *Y02P 90/16* (2015.11); *Y02P 90/18* (2015.11)

(58) Field of Classification Search
CPC .......... G05B 19/4185; G05B 19/41845; G05B 19/0423; G05B 19/0428; G05B 23/0267; H04L 69/08; H04L 67/32
USPC .... 700/1, 17, 18, 19, 20, 21, 52, 65, 86, 87, 700/79, 83, 90, 96, 177, 282; 702/122, 702/182, 183, 188; 709/201, 220, 223, 709/224, 227, 230
See application file for complete search history.

(56) References Cited

U.S. PATENT DOCUMENTS

| | | | |
|---|---|---|---|
| 2005/0066104 A1* | 3/2005 | Train et al. ................... | 710/305 |
| 2005/0097194 A1* | 5/2005 | Eisenbeis et al. ............ | 709/221 |
| 2005/0120106 A1* | 6/2005 | Albertao .................. | G06F 8/65 709/223 |
| 2005/0228509 A1* | 10/2005 | James ................. | H04L 12/4625 700/19 |
| 2005/0240919 A1* | 10/2005 | Kim, II .................... | G06F 8/65 717/168 |
| 2007/0078540 A1* | 4/2007 | Bump et al. .................... | 700/90 |
| 2008/0167860 A1* | 7/2008 | Goller ..................... | G10L 15/28 704/201 |
| 2010/0122245 A1* | 5/2010 | Igarashi et al. ............... | 717/170 |
| 2011/0054643 A1* | 3/2011 | Law ................... | G05B 23/0256 700/79 |
| 2011/0197187 A1* | 8/2011 | Roh ......................... | G06F 8/65 717/173 |
| 2012/0093242 A1 | 4/2012 | Wallace et al. | |
| 2012/0254339 A1* | 10/2012 | Holmes ........................ | 709/212 |
| 2013/0257627 A1* | 10/2013 | Rafael ....................... | 340/691.6 |

OTHER PUBLICATIONS

International Searching Authority, "Written Opinion", issued in connection with PCT patent application No. PCT/US2013/037683, dated Mar. 13, 2014, 6 pages.

International Searching Authority, "International Preliminary Report on Patentability", issued in connection with PCT patent application No. PCT/US2013/037683, dated Nov. 4, 2014, 7 pages.

\* cited by examiner

METHODS AND SYSTEMS TO PROVIDE UPDATE INFORMATION OF A DEVICE DESCRIPTION OF A FIELD INSTRUMENT

FIELD OF THE DISCLOSURE

This disclosure relates generally to process control systems and, more particularly, to methods and systems to provide update information of a device description of a field instrument.

BACKGROUND

Process control systems, like those used in chemical, petroleum or other processes, typically include one or more process controllers and input/output (I/O) devices communicatively coupled to at least one host or operator workstation and to one or more field devices or instruments via analog, digital or combined analog/digital buses. The field devices, which may be, for example, valves, valve positioners, switches and transmitters (e.g., temperature, pressure and flow rate sensors), perform process control functions within the process such as opening or closing valves and measuring process control parameters. The controllers receive signals indicative of process measurements made by the field devices, process this information to implement a control routine, and generate control signals that are sent over the buses or other communication lines to the field devices to control the operation of the process. In this manner, the controllers may execute and coordinate control strategies or routines using the field devices via the buses and/or other communication links communicatively coupling the field devices.

Information from the field devices and the controllers may be made available to one or more host applications (i.e., routines, programs, etc.) executed by the operator workstation (e.g., a processor-based system) to enable an operator and/or engineer to perform desired functions with respect to the process, such as viewing the current state of the process (e.g., via a graphical user interface), evaluating the process, modifying an operation of the process (e.g., via a visual object diagram), etc. In many instances, host applications achieve these ends by interacting with field devices based upon universal commands and functions implemented by each field device (e.g., reading the primary variable of the field device). However, field device manufacturers frequently develop device-specific commands and/or functionality that provides added value to the field device by enabling access to unique functions and/or data within the field device.

To enable host applications to interact with any number of different field devices, each having different device-specific functionality, manufacturers typically provide a file, which is associated with each field device they produce to be implemented via the host application, to describe and enable access to the unique functionality of the device. Such files are commonly known as Device Descriptions (DDs). In particular, DDs are often based on the Electronic Device Description Language (EDDL) and provide a structure and/or standardized format to describe and specify every accessible variable, command, function, procedure, menu, etc., associated with the corresponding field devices. Accordingly, process controllers and/or workstations may use DDs to facilitate interpretation, control, configuration, and/or management of field devices.

SUMMARY

Methods and systems to update information of a device description of a field instrument are described. In one example, a method involves comparing a host revision of the device description executed via a host application to an instrument revision of the device description of the field instrument, generating a character string of update information based on the comparison, the character string containing the update information, and displaying the character string via the host application.

In another example, a system includes a field instrument associated with an instrument revision of a device description for the field instrument, and a process control system host application to execute a host revision of the device description to enable interactions between the host application and the field instrument, where the field instrument is to compare the host and instrument revisions of the device description to generate a character string based on the comparison.

DETAILED DESCRIPTION

Manufacturers of field devices frequently develop device-specific commands and/or functionality accessible to operators of a process control system via a host application running in the control system. As used herein, the term 'operators' refers to process control system operators, engineers, administrators, and/or any others involved in the configuration, operation, maintenance, etc., of a process control system. These device-specific aspects of each field device are defined and made accessible via a Device Description (DD) file produced by the device manufacturer and provided to developers of host applications to be incorporated into the configuration, operation, and/or management of a process control system.

As field device manufacturers continue to develop and improve their field devices, the DD associated with each device may also be improved and/or changed. As a result, the ability to access new functionality within a new field device may require the host application have the most recent revision of the DD. Frequently, newer field devices are backward compatible with older revisions of the corresponding DDs such that interactions between a host application and the field devices are still possible and any new functionality may simply not be accessible. In such circumstances, operators may not be aware that there are new features available unless the older DD revisions are deemed incompatible by the newer devices. Not only may newer features be unavailable, but a lack of knowledge about updates to a DD also prevents known bugs in older revisions from being remedied.

Figure 1:
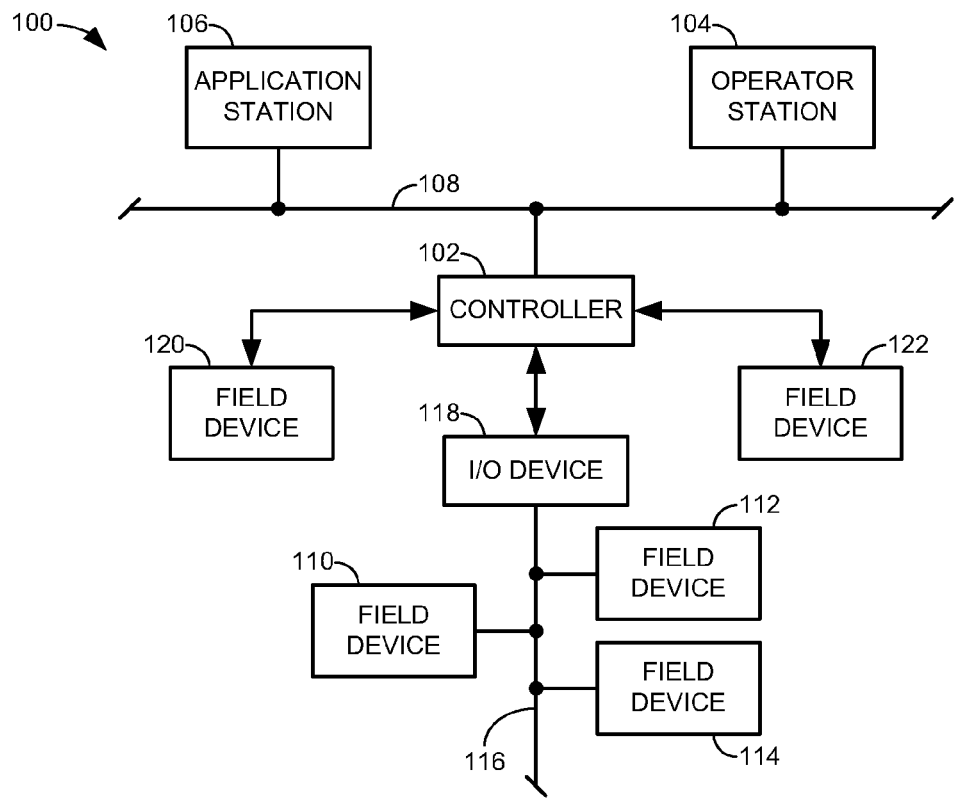
FIG. 1 is a schematic illustration of an example process control system within which the teachings of this disclosure may be implemented.

FIG. 1 is a schematic illustration of an example process control system 100 within which the teachings of this disclosure may be implemented. The example process control system 100 of FIG. 1 includes one or more process controllers (one of which is designated at reference numeral 102), one or more operator stations (one of which is designated at reference numeral 104), and one or more workstations (one of which is designated at reference numeral 106). The example process controller 102, the example operator station 104 and the example workstation 106 are communicatively coupled via a bus and/or local area network (LAN) 108, which is commonly referred to as an application control network (ACN).

The example operator station 104 of FIG. 1 includes and/or implements a host application (e.g., the example host application of FIG. 2) that communicates with various components of the process control system 100 to enable an operator to review and/or operate one or more operator display screens and/or applications that enable the operator to view process control system variables, states, conditions, alarms; change process control system settings (e.g., set points, operating states, clear alarms, silence alarms, etc.); configure and/or calibrate devices within the process control system 100; perform diagnostics of devices within the process control system 100; and/or otherwise interact with devices within the process control system 100. An example manner of implementing the example operator station 104 of FIG. 1 is described below in connection with FIG. 2.

The host application is associated with a host user interface (e.g., the example host user interface of FIGS. 4A and 4B) to display information and/or provide visual indications of the state of the process control system 100 and its component parts and/or to receive inputs from an operator. While operators may achieve a high-level overview of a process control system via the host user interface of the host application, they may also desire more detailed information and/or control of particular devices within the process control system. Accordingly, the example operator station 104 also includes and/or implements one or more Device Descriptions (DDs) (e.g., the example Device Description of FIG. 2) associated with corresponding devices that provide the structure and definitions for the host application to access device-specific functionality. Through these device-specific functions, the host application may send requests to a particular device and receive a response to render data, text, and/or graphics, etc., provided by the particular device via the host user interface. As will be described in greater detail below, in some examples, a host application may send a request for update information regarding a particular DD.

The example workstation 106 of FIG. 1 may be configured as an application station to perform one or more information technology applications, user-interactive applications and/or communication applications. For example, the workstation 106 may be configured to perform primarily process control-related applications, while another application station (not shown) may be configured to perform primarily communication applications that enable the process control system 100 to communicate with other devices or systems using any desired communication media (e.g., wireless, hardwired, etc.) and protocols (e.g., HTTP, SOAP, etc.). The example operator station 104 and the example workstation 106 of FIG. 1 may be implemented using one or more workstations and/or any other suitable computer systems and/or processing systems. For example, the operator station 104 and/or workstation 106 could be implemented using single processor personal computers, single or multi-processor workstations, etc.

The example LAN 108 of FIG. 1 may be implemented using any desired communication medium and protocol. For example, the example LAN 108 may be based on a hardwired and/or wireless Ethernet communication scheme. However, as will be readily appreciated by those having ordinary skill in the art, any other suitable communication medium(s) and/or protocol(s) could be used. Further, although a single LAN 108 is illustrated in FIG. 1, more than one LAN and/or other alternative pieces of communication hardware may be used to provide redundant communication paths between the example systems of FIG. 1.

The example controller 102 of FIG. 1 is coupled to a plurality of smart field devices 110, 112, 114 via a data bus 116 and an input/output (I/O) gateway 118. The smart field devices 110, 112, 114 may be Fieldbus compliant valves, actuators, sensors, etc., in which case the smart field devices 110, 112, 114 communicate via the data bus 116 using the well-known Foundation Fieldbus protocol. Of course, other types of smart field devices and communication protocols could be used instead. For example, the smart field devices 110, 112, 114 could instead be Profibus and/or HART compliant devices that communicate via the data bus 116 using the well-known Profibus and HART communication protocols. Additional I/O devices (similar and/or identical to the I/O gateway 118) may be coupled to the controller 102 to enable additional groups of smart field devices, which may be Foundation Fieldbus devices, HART devices, etc., to communicate with the controller 102.

In addition to the example smart field devices 110, 112, 114, one or more non-smart field devices 120, 122 may be communicatively coupled to the example controller 102. The example non-smart field devices 120, 122 of FIG. 1 may be, for example, conventional 4-20 milliamp (mA) or 0-24 volts direct current (VDC) devices that communicate with the controller 102 via respective hardwired links.

The example controller 102 of FIG. 1 may be, for example, a DeltaV™ controller sold by Fisher-Rosemount Systems, Inc., an Emerson Process Management company. However, any other controller could be used instead. Further, while only one controller 102 is shown in FIG. 1, additional controllers and/or process control platforms of any desired type and/or combination of types could be coupled to the LAN 108. In any case, the example controller 102 performs one or more process control routines associated with the process control system 100 that have been generated by a system engineer and/or other system operator using the operator station 104 and which have been downloaded to and/or instantiated in the controller 102.

While FIG. 1 illustrates an example process control system 100 within which the methods and systems to provide update information of a DD described in greater detail below may be advantageously employed, the methods and systems to control information presented to operators described herein may, if desired, be advantageously employed in other process plants and/or process control systems of greater or less complexity (e.g., having more than one controller, across more than one geographic location, etc.) than the illustrated example of FIG. 1.

Figure 2:
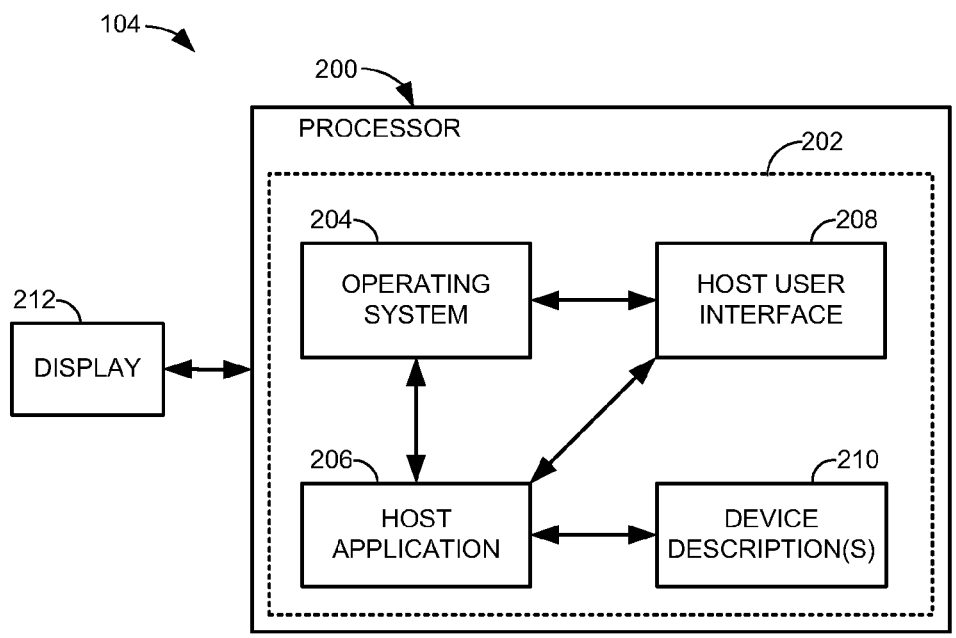
FIG. 2 illustrates an example manner of implementing the example operator station of FIG. 1.

FIG. 2 illustrates an example manner of implementing the example operator station 104 of FIG. 1. While the following description is provided with respect to the operator station 104, the example manner of implementing the example operator station 104 may also be used to implement the example workstation 106 of FIG. 1. The example operator station 104 of FIG. 2 includes at least one programmable processor 200. The example processor 200 of FIG. 2 executes coded instructions present in a main memory 202 of the processor 200 (e.g., within a random-access memory (RAM) and/or a read-only memory (ROM)). The processor 200 may be any type of processing unit, such as a processor core, a processor and/or a microcontroller. The processor 200 may execute, among other things, an operating system 204, a host application 206, a host user interface 208, and one or more DDs 210. An example operating system 204 is an operating system from Microsoft®. The example main memory 202 of FIG. 2 may be implemented by and/or within the processor 200 and/or may be one or more memories and/or memory devices operatively coupled to the processor 200.

To allow operators to interact with the example processor 200, the example operator station 104 of FIG. 2 includes any type of display 212. Example displays 212 include, but are not limited to, a computer monitor, a computer screen, a television, a mobile device (e.g., a smart phone, a Blackberry™ and/or an iPhone™), etc., capable of displaying user interfaces and/or applications implemented by the processor 200 and/or, more generally, the example operator station 104. The example operating system 204 of FIG. 2 displays and/or facilitates the display of the example host user interface 208 of the example host application 206 by and/or at the example display 212. Similarly, the example operating system 204 displays and/or facilitates the display of information provided by the DDs 210 via the host user interface 208 within one or more DD output displays. Example DD output displays are described below in connection with FIGS. 3 and 4.

The example host application 206 may be a high-level process control system software application or any other human-machine interface (HMI) software application that enables an operator to have a high-level overview of a process control system (e.g., the process control system 100 of FIG. 1) and/or to control, configure, diagnose, or otherwise interact with the control system 100 and/or acquire data regarding the processes and devices within the process control system 100. More specifically, the host application 206 may invoke and/or communicate with the various field devices within the process control system 100 including any software associated with each device, such as the corresponding DD 210. In some examples, a revision number of a particular DD 210 may be sent to a corresponding device to request update information relating to the DD 210 as is described more fully below.

While an example manner of implementing the example operator station 104 of FIG. 1 has been illustrated in FIG. 2, the data structures, elements, processes and devices illustrated in FIG. 2 may be combined, divided, re-arranged, omitted, eliminated and/or implemented in any other way. Further, the example operating system 204, the example host application 206, the example host user interface 208, the example DDs 210, and/or, more generally, the example operator station 104 of FIG. 2 may be implemented by hardware, software, firmware and/or any combination of hardware, software and/or firmware. Further still, the example operator station 104 may include additional elements, processes and/or devices instead of, or in addition to, those illustrated in FIG. 2, and/or may include more than one of any or all of the illustrated data structures, elements, processes and/or devices.

Figure 3:
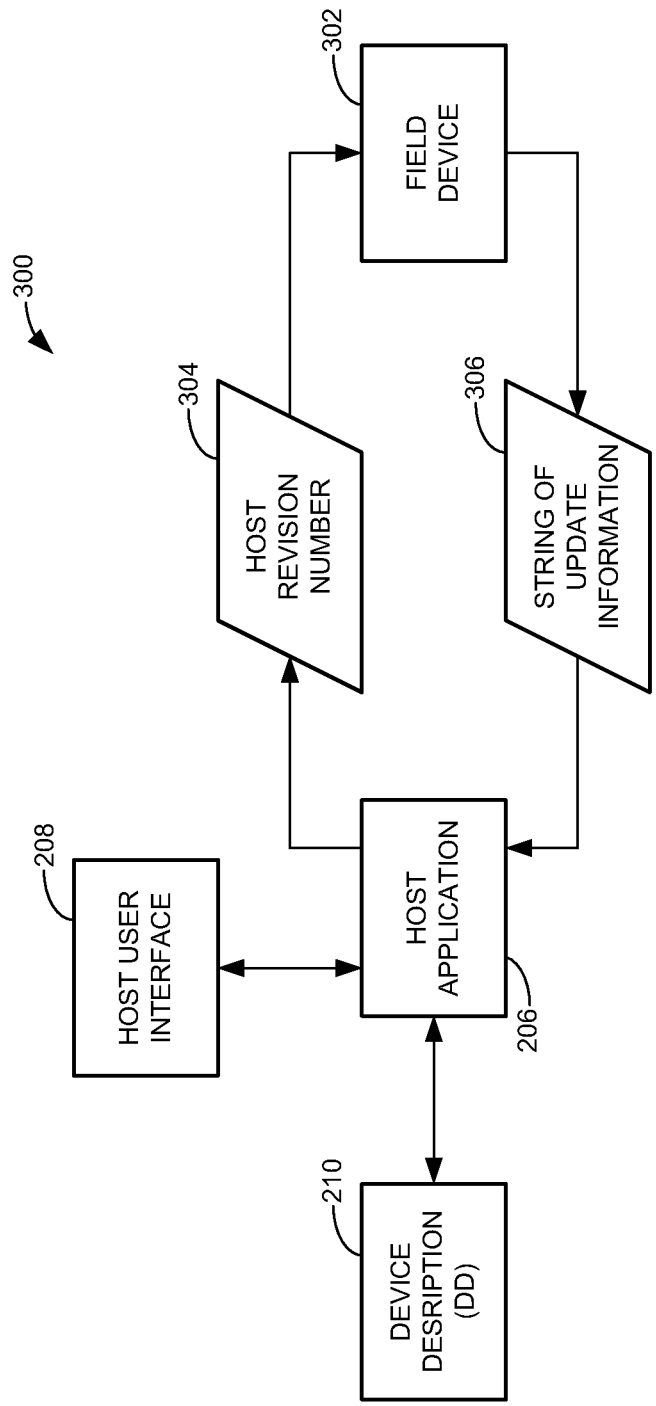
FIG. 3 is a schematic diagram of an example system to provide update information for a Device Description implemented in the example operator station of FIG. 2.

FIG. 3 is a schematic diagram of an example system 300 to provide update information for a DD implemented in connection with the example operator station 104 of FIG. 2. In the example system 300, the host application 206 is in communication with and/or implements the DD 210 associated with a particular field instrument 302 corresponding to any one of the example field devices 110, 112, 114, 120, 122 in the process control system 100 of FIG. 1. For the sake of clarity, the term 'instrument' is used in the examples described below, however, the terms 'instrument' and 'device,' as used herein, are interchangeable. The host application 206 is also in communication with the host user interface 208 through which operators can provide inputs and/or review outputs generated via the host application 206.

In some examples, an operator may request via the host user interface 208 for the host application 206 to provide the update status of the DD 210 and/or other update information. As neither the host application 206 nor the DD 210 implemented by the host application 206 have any knowledge of subsequent revisions of the DD 210, in some examples the host application 206 may send a request to the field instrument 302 associated with the DD 210 to compare the revision of the DD 210 currently employed by the host application 206 with the latest revision of the DD 210 known to the field instrument 302. For example, the field instrument 302 may have been manufactured after a subsequent revision of the DD 210 had been released. As a result, the manufacturer of the field instrument 302 may have produced the field instrument 302 with the subsequent revision in mind and incorporated relevant information in the field instrument 302 pertaining to the subsequent revision to enable the field instrument 302 to make compare the subsequent revision of the DD 210 with the revision implemented by the host application 206. While the field instrument 302 may have access to information regarding later revisions of the DD 210 based on when the field instrument was manufactured and when the later revisions of the DD 210 are released, the field instrument 302 may not be able to automatically determine what revision the host application 206 is implementing. Accordingly, along with the request sent to the field instrument 302, the host application 206 may also transmit the version or revision number 304 of the DD 210 the host application 206 is currently using to enable the comparison. As used herein, the revision of the DD 210 provided by the host application 206 is referred to as the 'host revision' because it is the revision used by the host application 206.

After the host application 206 has sent the request for update information along with the host revision number 304, the field instrument 302 may compare the host revision number 304 to the revision number of the latest revision of the DD 210 for which the field instrument 302 has information. As used herein, the latest version of the DD 210 for which the field instrument 302 has information is referred to as the 'instrument revision' of the DD 210. After comparing the revision numbers of the DD 210, the example field instrument 302 may prepare a string (e.g., ASCII characters) containing update information 306 that is sent to the host application 206 and subsequently displayed to an operator via the host user interface 208. While the host application 206 could request the instrument revision number from the field instrument 302 and then the host application 206 could perform the comparison with the host revision number 304 of the DD 210, the resulting output could provide nothing more than whether the DD 210 is up to date or not (i.e., whether the instrument revision is the same as or newer than the host revision). In contrast, in the illustrated example, the field instrument 302 may provide additional information beyond indicating whether the host revision 304 of the DD 210 is up to date because the field instrument 302 may be manufactured after the newer revisions of the DD 210 have been released and, therefore, have additional information relating to the newer revisions. For example, the string of update information 306 generated by the example field instrument 302 may include how many revisions there have been between the host revision 304 and the instrument revision, what additional features and/or functionalities are available with a newer revision, what bugs in the host revision are remedied by the newer revision, and/or where the operator may go to obtain the newer revision and/or obtain more information about the newer revision. In some examples, the string of update information 306 may include a hyperlink to enable the operator to immediately link to a website where the information and or updates are provided. None of this additional information would be available if the host application 206 compared the revision numbers because the host application 206 uses the host revision of the DD 210 rather than the later revisions of the DD 210 (e.g., the instrument revision) as the basis of the comparison.

The example field instrument 302 may provide any of the information above described because the field instrument 302 is at least as new as the instrument revision of the DD 210 and, therefore, information contrasting all prior revisions may be incorporated into the software and/or firmware of the field instrument 302. While this information may be included with a new device (e.g., the field instrument 302), the information may be accessible by the host application 206 only if the host revision of the DD 210 already defines the appropriate commands to request the information because the host application 206 communicates with the field instrument 302 via the host revision of the DD 210. Accordingly, in some examples, the command(s) provided within the DD 210 are standardized early on to function properly as newer revisions of the DD 210 are developed along with newer field instruments 302. For example, an early version of the DD 210 of FIG. 3 may contain a Build String command to tell the field instrument 302 to generate a certain ASCII string for the DD 210 and a Read String command to read the string built by the field instrument 302. By incorporating these commands into subsequent revisions of the DD 210, a host application 302 with the early version of the DD 210 (e.g., the host revision) can request a newer field instrument 302 manufactured to function with a newer revision of the DD 210 (e.g., the instrument revision) to build a string providing the update information 306 and then read the string as it is sent from the field instrument 302 to be displayed via the host user interface 208.

Figure 4A:
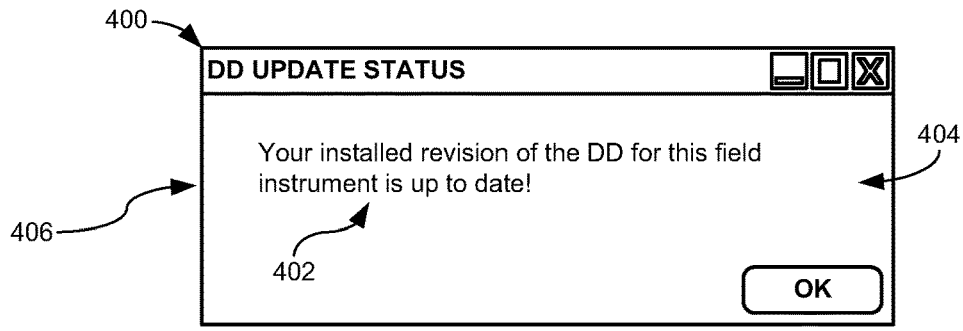
FIG. 4A illustrates an example Device Description output display providing an example string of update information corresponding to an up to date Device Description associated with the field instrument of FIG. 3.

FIG. 4A illustrates an example DD output display 400 providing an example string of update information 402 corresponding to an up to date DD 210 associated with the field instrument 302 of FIG. 3. In some examples, the output display 400 may be generated by the host application 206 and rendered via the host user interface 208. Within the DD output display 400 the host application 206 provides a space 404 to display data retrieved from the field instrument 302 associated with the DD 210. Although the illustrated example shows the output display 400 in its own window, in some examples, the host application 206 may provide the space 404 directly within the host user interface 208. Furthermore, the host application 206 may otherwise format the presentation of the retrieved data in any suitable manner such as by changing the size, shape, and or position of the space 404. Regardless of the characteristics of the space 404, a single screen of the space 404 is referred to herein as a page. Thus, the illustrated examples show the update information 402 included within one page 406. However, in some examples, multiple pages may be necessary to provide sufficient space for an entire string generated from the field instrument 302.

Figure 4B:
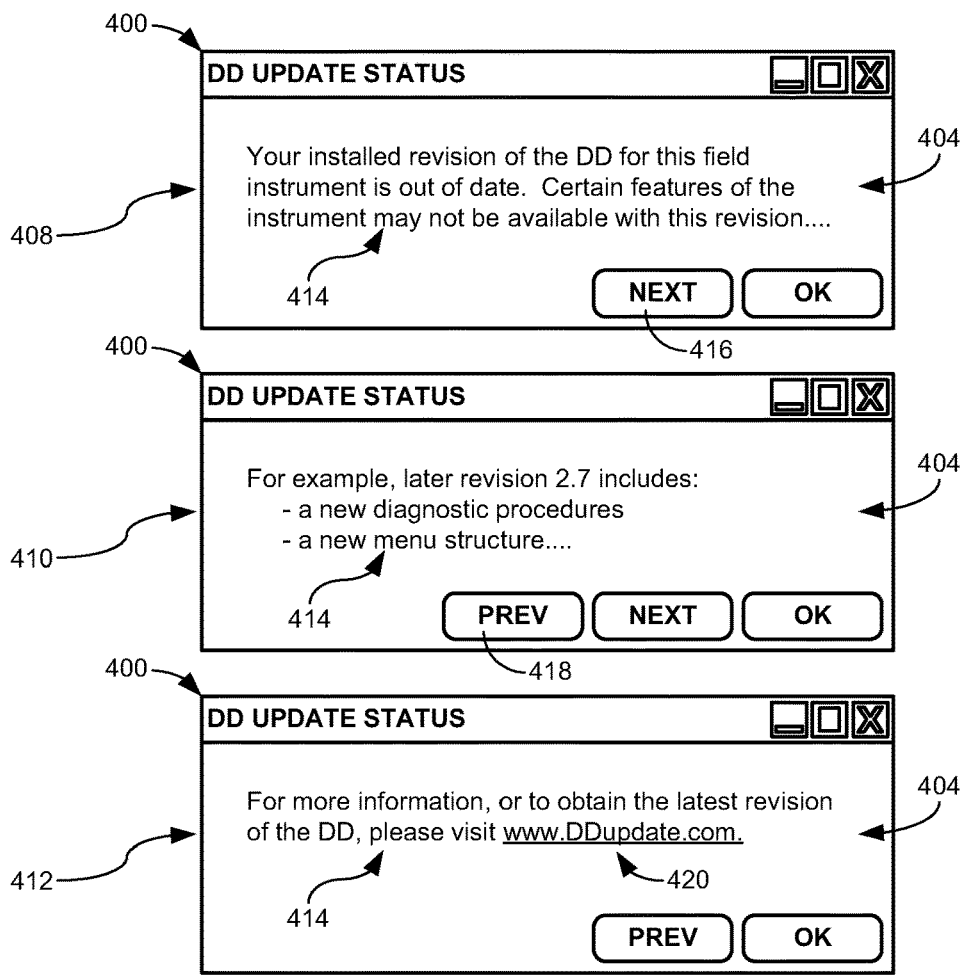
FIG. 4B illustrates multiple pages of the example Device Description output display of FIG. 4A containing an example string of update information corresponding to an out of date Device Description associated the field instrument of FIG. 3.

For example, FIG. 4B illustrates multiple pages 408, 410, 412 of the example DD output display 400 of FIG. 4A containing an example string of update information 414 corresponding to an out of date DD 210 associated with the field instrument 302 of FIG. 3. To enable the update information 414 of the illustrated example to be properly presented via the DD output display 400, the host application 206 may send a request to the field instrument 302 to build a string via a Build String command of the DD 210. In addition to the request for a string, the Build String command may also provide parameters defining and/or limiting how the string of update information 414 is to be displayed including a maximum number of pages the field instrument 302 may build, a maximum number of bytes the DD 210 can handle per page, and a maximum number of lines the DD 210 can handle per page. In this manner, the field instrument 302 may build or generate a string that satisfies these parameters and, when necessary, split the returned string into multiple segments to be displayed incrementally on separate pages of the DD output display 400. Furthermore, the Build String command may have additional functionality such as determining a status of the string generation, defining a type of string to be built, determining a total number of pages corresponding to a particular string, and/or any other suitable function.

In the illustrated example of FIG. 4B, the length of the example string of update information 414 is long enough to require three pages 408, 410, 412 because the space 404 is limited in the illustrated example to three lines. In operation, the field instrument 302, having received the parameters defined for the space 404 via the Build String command of the DD 210, sends a first part of the example update information 414 corresponding to text of the first page 408 to the host application 206, which is then rendered in the space 404. Along with the first part of the update information 414, the host application 206 provides an ability to advance to another page (e.g., the second page 410) of the update information 414 (e.g., via a "next" button 416). As an operator advances to the next page 410 a second part of the update information 414 is sent to the host application 206 and rendered in the space 404, at which point the operator may either advance to the next page (e.g., the third page 412), via the "next" button 416, or return to the previous page (e.g., the first page 408), via a "prev" button 418.

Many field instruments (e.g., the field instrument 302) are limited in the amount of data they can transfer at any one time. For example, some host applications (e.g., the host application 206) may only be able to read approximately 70 bytes of information via a DD at a time. Accordingly, in some examples, the space 404 provided for output strings (e.g., the size of a single page (e.g., the page 406)) within the output display 400 may be greater than what the field instrument 302 can send at one time. Accordingly, in such examples, the field instrument 302 may divide the string of update information 414 into subpages to be sent incrementally until a complete page is filled and then, if necessary, advance to subsequent pages until the string of update information 414 has been sent and displayed. The example host application 206 of FIG. 4B may interpret the individual pages 408, 410, 412 and/or subpages segmenting the update information 414 via a Read String command of the DD 210. In some examples, the Read String command may include various functions including determining and/or defining a status of the read process, a number of lines on a current page, a number of subpages on the current page, a total number of pages to read, a type of string to be read, and/or a particular page of the string to read.

The information provided in the strings of the update information 402, 414 is determined based on a comparison of the host revision number 304 of the DD 210 with the instrument revision number of the DD 210. When the revision number of the DD 210 implemented by the host application 206 (i.e., the host revision number 304) is the same as the revision number of the latest revision for which the field instrument 302 has information (i.e., the instrument revision number), the returned string from the field instrument 302 will indicate the DD 210 is up to date as illustrated in the example strings of update information 402 in FIG. 4A. More particularly, the update information 402 indicates that the DD 210 is up to date at least with respect to the particular field instrument 302 that generated the update information. It may be possible for a later revision of the DD 210 to exist of which the field instrument 302 has no information, but that would have no bearing on the host application 206 accessing the functionality of the particular field instrument 302, which requires only the latest revision of the DD 210 for which the field instrument 302 does have information. Likewise, in some examples, there may be other field devices similar to the field instrument 302 that each use the same DD 210 to communicate with the host application 206. In such instances, each of the other field devices may have different information regarding the latest revisions of the DD 210 because the field devices were manufactures at different times relative to when different revisions of the DD 210 have been released. However, whether the latest revision known to each of these other field devices is different than or the same as the host revision and/or the instrument revision of the particular field instrument 302 is irrelevant to the update status of the DD 210 with respect to the field instrument 302.

Similarly, in some examples, the host revision number 304 may be newer than the instrument revision number. In such examples, the returned string may still correspond to the string of update information 406 in FIG. 4A because the newer revision of the DD 210 is backwards compatible such that all functionality in the field instrument 302 (manufactured under an older revision of the DD 210) would still be accessible. In contrast, where the field instrument 302 determines that the host revision of the DD 210 is older than the instrument revision of the DD 210, the returned string may correspond to the update information 414 in FIG. 4B indicating that the DD 210 is out of date.

In addition to indicating the update status of the host revision (i.e., whether the host revision of the DD 210 is up to date), the update information 402, 414 may also contain additional information beneficial to an operator. For example, the update information 402 of FIG. 4A is limited to indicating the update status of the DD 210. However, on the first page 408 of the output display 400, the example update information 414 in FIG. 4B indicates the update status and informs an operator that certain features of the field instrument 302 are not available. On the second page 410, the example update information 414 briefly describes what some of the missing features include. On the third page 412, the example update information 414 explains how to obtain the latest revision of the DD 210 and/or where to get a more detailed explanation of the later revision of the DD 210 by providing a website address 420. In some examples, the website address 420 is a hyperlink to enable an operator to go directly to the corresponding website. In some examples, the update information 402 in FIG. 4A may also include information on where to obtain and/or learn about the latest revisions of the DD 210 even when the DD 210 appears to be up to date (e.g., with respect to the particular field instrument 302) because this may provide the operator the option to see whether a later revision of the DD 210 has been developed since the field instrument was developed (i.e., a revision later than the instrument revision).

In the illustrated examples, while the information indicated in the strings of update information 402, 414 is determined based on the comparison of the host revision number 304 and the instrument revision number of the DD 210, the actual content of the update information 402, 414 (e.g., the arrangement of characters, words, and/or phrasing within the strings) is primarily preconfigured within the field instrument 302. For example, a string corresponding to the update information 402 in FIG. 4A may be stored in the software and/or firmware of the field instrument 302 along with the revision number of the latest revision of the DD 210 known at the time the field instrument 210 was manufactured (i.e., the instrument revision). Then, when the field instrument 302 is requested to compare the host revision number 304 to the instrument revision number and determines whether they are the same (or that the host revision is newer), the field instrument 302 merely needs to reproduce the previously stored string as it generically applies to any instance of the host revision being the same as (or newer than) the instrument revision, regardless of the actual revision numbers.

This same approach applies to situations where the host revision of the DD 210 is older than the instrument because a statement that the DD 210 is out of date, that certain features of the field instrument 302 may be unavailable, or that newer revisions and/or more information can be obtained elsewhere can all be provided with generic language that is independent of the actual revision numbers of either the host revision or the instrument revision. Furthermore, each of these statements may be grouped into a single character string, thereby effectively turning the request to build a string into a request to return a block of preconfigured text. However, if particular unavailable features are to be listed or outlined, the actual revision numbers associated with the host application 206 and the field instrument 302 become relevant. In that case, preset strings of update information (e.g., the update information 414) can be incorporated into the field instrument 302 at the time of its manufacture. As an example, a DD 210 may have five existing revisions with revision numbers 1.0, 1.5, 2.0, 2.7, and 3.0. If the field instrument 302 were fabricated after the release of revision number 2.7 and before the release of revision number 3.0, the field instrument 302 may cover all possible update scenarios with four stored character strings: (1) a string comparing revisions 2.7 and 1.0, (2) a string comparing revisions 2.7 and 1.5, (3) a string comparing revisions 2.7 and 2.0, and (4) a string for when the host revision number is 2.7 or higher. As the field instrument 302 was manufactured prior to the release of revision 3.0, the field instrument 302 would have no information regarding this revision and therefore no information to provide but could nevertheless provide an explanation that the DD 210 is up to date because it is at least as new as the instrument revision (e.g., revision 2.7). Thus, while none of the above listed strings would mention revision 3.0, any of these strings may include an explanation that subsequent revisions may exist and provide information of how to discover such revisions. Accordingly, when the field instrument 302 is requested to build a string to provide the update information 402, 414, the field instrument 302 may select a string from a series of preset alternatives built into the field instrument 302.

In other examples, the field instrument 302 may have strings preconfigured according to different types of information that may then be concatenated into a single string at build time based on the comparison of the host revision number 304 and the instrument revision number of the DD 210. For example, one string may state that the DD 210 is up to date, another may state the DD 210 is out of date, a third may indicate where additional information can be obtained, a fourth may generically state that certain features are missing, and others may include individual features to be listed as particular features missing from one or more later revisions of the DD 210. In yet other examples, the string generated by the field instrument 302 may include a placeholder to insert the host revision number 304 so that the current host revision of the DD 210 may be indicated to an operator at the same time as the update information 414 is explaining other aspects of the newer instrument revision.

While the example update information 402, 414 illustrated in FIGS. 4A and 4B may be provided according to the foregoing examples, any other suitable information may also be provided within the returned strings in addition to that which has been described in connection with these examples. Furthermore, the example strings of update information 402, 414 are by way of example only and can be phrased, ordered, or otherwise presented in any suitable manner.

Figure 5:
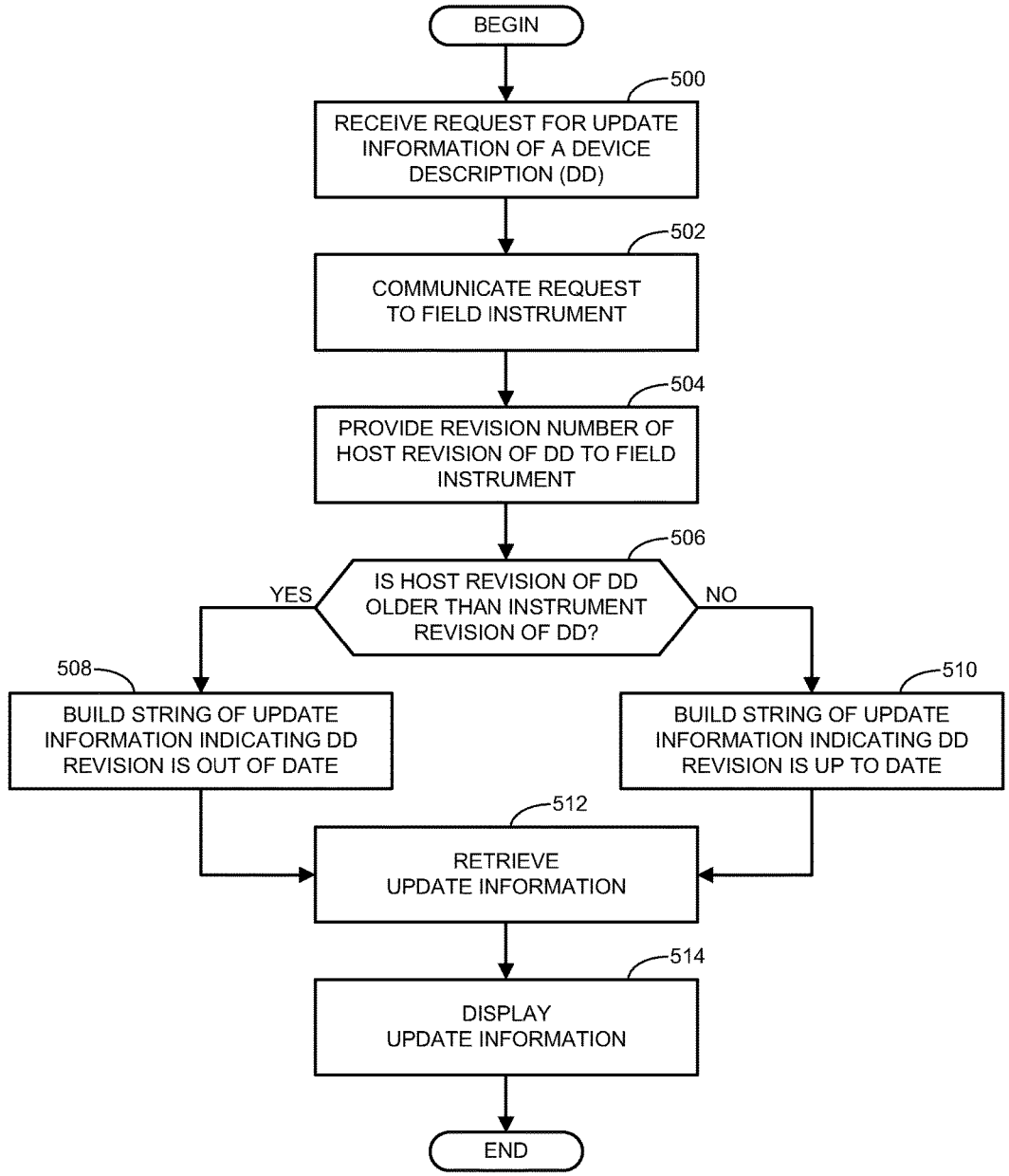
FIG. 5 is a flowchart representative of an example process that may be carried out to implement the example operator station of FIG. 2 to provide Device Description update information described in connection with FIGS. 1-4B.

FIG. 5 is a flowchart representative of an example process that may be carried out to implement the example operator station 104 of FIG. 2 to provide the example DD update information described in connection with FIGS. 1-4B. More particularly, the example process of FIG. 5 may be representative of machine readable instructions that comprise a program for execution by a processor such as the processor 612 shown in the example processor platform 600 discussed below in connection with FIG. 6. The program may be embodied in software stored on a tangible computer readable medium such as a CD-ROM, a floppy disk, a hard drive, a digital versatile disk (DVD), a BluRay disk, or a memory associated with the processor 612. Alternatively, some or all of the example process of FIG. 5 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, one or more of the example operations of FIG. 5 may be implemented manually or as any combination(s) of any of the foregoing techniques, for example, any combination of firmware, software, discrete logic and/or hardware. Further, although the example process is described with reference to the flowchart illustrated in FIG. 5, many other methods of implementing the example operator station 104 of FIG. 2 may alternatively be used. For example, the order of execution of the blocks may be changed, and/or some of the blocks described may be changed, eliminated, or combined. Additionally, any or all of the example process of FIG. 5 may be performed sequentially and/or in parallel by, for example, separate processing threads, processors, devices, discrete logic, circuits, etc.

As mentioned above, the example process of FIG. 5 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example process of FIG. 5 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

The example process of FIG. 5 begins at block 500 where the host application 206 of the process control system 100 receives a request from an operator via the host user interface 208 for update information of the DD 210 corresponding to a particular field instrument (e.g., 302 of FIG. 3). In some examples, the host application 206 may automatically generate the request for update information without an operator inputting the request, as for example, when a new field instrument is first incorporated into the process control system 100 or at any other suitable time. The host application 206 then communicates the request to the corresponding field instrument 302 (block 502). The host application 206 communicates with the field instrument 302 via a corresponding DD 210 installed with the host application 206. In particular, the host application 206 sends commands, via the DD 210, that instruct the field instrument 302 to build a string (e.g., Build String command) and provide a return string with information necessary for the host application 206 to read and display the string (e.g., Read String command).

In addition to communicating the request, the host application 206 also provides the host revision number (e.g., 304 of FIG. 3) of the DD 210 installed with the host application 206 (i.e., the host revision of the DD 210) (block 504). In this manner, the field instrument 302 may compare the host revision number 304 with the instrument revision number corresponding to the latest revision of the DD 210 for which the field instrument 302 has information. Accordingly, the field instrument 302 determines whether the host revision of the DD 210 is older than the instrument revision of the DD 210 (block 506). If the field instrument 302 determines that the host revision is older than the instrument revision, the field instrument 302 builds a string of update information (e.g., 306 of FIG. 3) indicating the DD 210 is out of date (block 508). Additionally, the string of update information 306 may include any other pertinent information that the field instrument 302 is able to provide, for example, whether certain features of the field instrument 302 are unavailable through the host revision of the DD 210, what the unavailable features may involve, and/or where the operator may for to obtain additional information and/or an updated version of the DD 210. In some examples, the field instrument 302 builds the strings by selecting from a series of alternative strings prebuilt and stored within the field instrument 302. In other examples, the build string functionality of the field instrument 302 may be more dynamic and capable of combining several strings and/or including additional information within the string of update information 306.

If the field instrument 302 determines that the host revision is not older than the instrument revision (i.e., the host revision is the same as or newer than the instrument revision of the DD 210), the field instrument 302 builds a string of update information 306 indicating the DD 210 is up to date (block 510). The string is built in the same manner as described above for the string indicating the DD 210 is out of date. In some instances, newer revisions of the DD 210 than the instrument revision may exist of which the field instrument 302 has no information. As such, the indication that the DD 210 is up to date is limited to the update status of the DD 210 with respect to that particular field instrument 302 (i.e., the DD 210) enables access to all functionality and features provided by the particular field instrument 302). Accordingly, in some examples, the string of update information 306 may include an explanation that newer revisions of the DD 210 may exist but that any newer DD 210 is unnecessary to benefit from using the particular field instrument 302 that built the string of update information 306.

Whether the string of update information 306 is based on an up to date revision of the DD 210 or an out of date revision of the DD 210, the field instrument 302 returns the string to be retrieved by the host application 206 via the DD 210 (block 512). The string of update information 306 may be sent at one time or in multiple packets depending upon the size of the string and constraints and/or parameters defined in the Build String and Read String commands. As the string of update information 306 is retrieved, it is displayed via the host user interface 208 within one or more pages of a DD output display (e.g., 400 of FIG. 4A) described above in connection with FIGS. 4A and 4B (block 514). Once the string of update information 306 has been displayed, the process of FIG. 5 ends.

Figure 6:
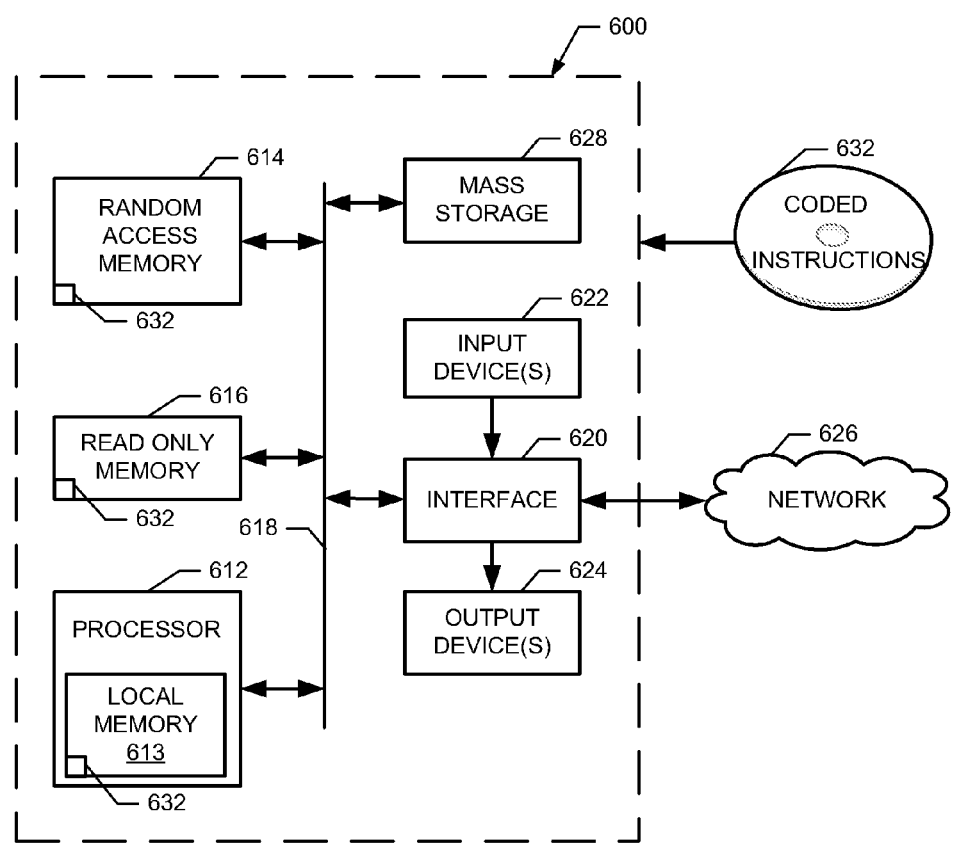
FIG. 6 is a schematic illustration of an example processor platform that may be used and/or programmed to execute the example process of FIG. 5 to implement the system of FIG. 3 and/or the operator station of FIG. 2.

FIG. 6 is a schematic illustration of an example processor platform 600 that may be used and/or programmed to execute the example process of FIG. 5 to implement the system 300 of FIG. 3 and/or the operator station 104 of FIG. 2. The processor platform 600 can be, for example, a server, a personal computer, an Internet appliance, or any other type of computing device. The process platform 600 of the instant example includes a processor 612. For example, the processor 612 can be implemented by one or more microprocessors or controllers from any desired family or manufacturer.

The processor 612 includes a local memory 613 (e.g., a cache) and is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 also includes an interface circuit 620. The interface circuit 620 may be implemented by any type of interface standard, such as an Ethernet interface, a universal serial bus (USB), and/or a PCI express interface.

One or more input devices 622 are connected to the interface circuit 620. The input device(s) 622 permit a user to enter data and commands into the processor 612. The input device(s) can be implemented by, for example, a keyboard, a mouse, a touch screen, a track-pad, a trackball, isopoint and/or a voice recognition system. One or more output devices 624 are also connected to the interface circuit 620. The output devices 624 can be implemented, for example, by display devices (e.g., a liquid crystal display, a cathode ray tube display (CRT), a printer and/or speakers). The interface circuit 620, thus, typically includes a graphics driver card.

The interface circuit 620 also includes a communication device such as a modem or network interface card to facilitate exchange of data with external computers via a network 626 (e.g., an Ethernet connection, a digital subscriber line (DSL), a telephone line, coaxial cable, a cellular telephone system, etc.). The processor platform 600 also includes one or more mass storage devices 628 for storing software and data. Examples of such mass storage devices 628 include floppy disk drives, hard drive disks, compact disk drives and digital versatile disk (DVD) drives. Coded instructions 632 to implement the example processes of FIG. 5 may be stored in the mass storage device 628, in the volatile memory 614, in the non-volatile memory 616, and/or on a removable storage medium such as a CD or DVD.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method, comprising:
transmitting a request from a computing device to a field device of a process control system instructing the field device to generate a message corresponding to update information associated with a device description file executed by the computing device, the device description file to facilitate access of a first function of the field device by the computing device, the request including a first version of the device description file;
comparing, at the field device, the first version to a second version of the device description file stored in the field device;
in response to determining that the first version is different than the second version based on the comparison, generating the message to include a hyperlink and information identifying function differences between the first version and the second version, the function differences corresponding to at least a second function of the field device not available to the computing device when using the first version; and
in response to receiving the message at the computing device from the field device, displaying the message via a host application executed by the computing device, the displayed message providing the hyperlink to direct the computing device to a web site to obtain the second version.

2. The method of claim 1, wherein the update information indicates that the second version of the device description file is newer than the first version.

3. The method of claim 1, wherein the hyperlink is a website address where at least one of information of the second version of the device description file, information of other versions of the device description file, or copies of the second version or the other revisions of the device description file are accessible.

4. The method of claim 1, wherein generating the message includes selecting a first preconfigured string from a series of alternative preconfigured strings.

5. The method of claim 1, wherein the message indicates issues associated with the first version of the device description file that are remedied by the second version of the device description file.

6. The method of claim 1, wherein the field device is a valve that communicates the message to the computing device via HART communication protocol or Profibus communication protocol.

7. The method of claim 1, wherein the field device is manufactured after the first version has been released.

8. The method of claim 1, wherein the hyperlink is to direct the computing device to the web site to obtain a third version, the third version released after the second version, the message not indicating an availability of the third version.

9. The method of claim 1, wherein the function differences are first function differences, and wherein generating the message includes:
generating a first character string based on comparing second function differences between the first version and a third version, the third version released after the first version and before the second version;
generating a second character string based on comparing third function differences between the second version and the third version; and
generating the message by concatenating the first character string and the second character string, the first character string and the second character string corresponding to the first function differences.

10. A tangible computer readable storage device storing machine readable instructions, which when executed, cause a computing device and a field device of a process control system to at least:
transmit a request from the computing device to the field device instructing the field device to generate a message corresponding to update information associated with a device description file executed by the computing device, the device description file to facilitate access of a first function of the field device by the computing device, the request including a first version of the device description file;
compare, at the field device, the first version to a second version of the device description file stored in the field device;
in response to determining that the first version is different than the second version based on the comparison, generate the message to include a hyperlink and information identifying function differences between the first version and the second version; and
in response to receiving the message at the computing device from the field device, provide the message to a host application executed by the computing device for display, the displayed message providing the hyperlink to direct the computing device to a website to obtain the second version.

11. The tangible computer readable storage device of claim 10, wherein the update information indicates that the first version of the device description file is one of up to date or out of date.

12. The tangible computer readable storage device of claim 10, wherein the hyperlink is a website address where at least one of information of the second version of the device description file, information of other versions of the device description file, or copies of the second version or the other revisions of the device description file are accessible.

13. The tangible computer readable storage device of claim 10, wherein the field device is a valve that communicates the message to the computing device via HART communication protocol or Profibus communication protocol.

14. The tangible computer readable storage device of claim 10, wherein the hyperlink is to direct the computing device to the web site to obtain a third version, the third version released after the second version, the message not indicating an availability of the third version.

15. The tangible computer readable storage device of claim 10, wherein the function differences are first function differences, and further including instructions, which when executed, cause the field device to at least:
generate a first character string based on comparing second function differences between the first version and a third version, the third version released after the first version and before the second version;
generate a second character string based on comparing third function differences between the second version and the third version; and
generate the message by concatenating the first character string and the second character string, the first character string and the second character string corresponding to the first function differences.

16. A system, comprising:
a computing device of a process control system to interact with a field device via a first version of a device description file executed by the computing device, the device description file to facilitate access of a first function of the field device by the computing device, the computing device to transmit a request to the field device instructing the field device to generate a message corresponding to update information associated with the device description file, the request including the first version;
the field device to:
compare the first version and a second version of the device description file stored in the field device; and
generate the message when the first version is different than the second version based on the comparison, the message to include a hyperlink and information to identify function differences between the first version and the second version, the function differences corresponding to at least a second function of the field device not available to the computing device when using the first version; and
a display of the computing device to render the message via a user interface when the computing device receives the message from the field device, the displayed message providing the hyperlink to direct the computing device to a website to obtain the second version.

17. The system of claim 16, wherein the hyperlink is a website address where at least one of information of the second version of the device description file, information of other versions of the device description file, or copies of the second version or other versions of the device description file are accessible.

18. The system of claim 16, wherein the field device is a valve that communicates the message to the computing device via HART communication protocol or Profibus communication protocol.

19. The system of claim 16, wherein the hyperlink is to direct the computing device to the web site to obtain a third version, the third version released after the second version, the message not indicating an availability of the third version.

20. The system of claim 16, wherein the function differences are first function differences, and wherein the field device is to:
generate a first character string based on comparing second function differences between the first version and a third version, the third version released after the first version and before the second version;
generate a second character string based on comparing third function differences between the second version and the third version; and
generate the message by concatenating the first character string and the second character string, the first character string and the second character string corresponding to the first function differences.

\* \* \* \* \*